US007457081B2

United States Patent
Oishi

(10) Patent No.: US 7,457,081 B2
(45) Date of Patent: Nov. 25, 2008

(54) RECORDING DISK CARTRIDGE (HAVING A CARTRIDGE CASE) FOR STORING A PLURALITY OF FLEXIBLE RECORDING MEDIA INTEGRALLY AND ROTATABLY

(75) Inventor: Kengo Oishi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 558 days.

(21) Appl. No.: 11/196,764

(22) Filed: Aug. 4, 2005

(65) Prior Publication Data
US 2006/0044686 A1 Mar. 2, 2006

(30) Foreign Application Priority Data
Sep. 2, 2004 (JP) ............................. 2004-255640

(51) Int. Cl.
*G11B 23/03* (2006.01)
(52) U.S. Cl. .................. 360/133; 360/98.02; 360/99.04
(58) Field of Classification Search ................ 360/133, 360/98.02–98.06
See application file for complete search history.

(56) References Cited

U.S. PATENT DOCUMENTS 4,646,192 A * 2/1987 Droux et al. ................ 360/133
4,743,989 A * 5/1988 Bauck et al. ................ 360/133
2003/0231427 A1 12/2003 Nakamikawa

FOREIGN PATENT DOCUMENTS

| JP | 04-176069 A | 6/1992 |
| JP | 2002-352546 A | 12/2002 |
| JP | 2003-338151 A | 11/2003 |

* cited by examiner

*Primary Examiner*—A. J. Heinz
(74) *Attorney, Agent, or Firm*—Sughrue Mion, PLLC

(57) ABSTRACT

Disclosed is a recording disk cartridge which improves its assembly and production capacities, as well as the flexibility of the design. The recording disk cartridge that has a cartridge case including flexible recording disk media in an integrally rotatable fashion, a lower plate forming a lower wall of the cartridge case, the lower wall being placed parallel to the recording disk media, one or more inner plates being fixed on the lower plate with being stacked and partitioning the recording disk media, and an upper plate being fixed on the inner plates and forming an upper wall of the cartridge case. Furthermore, the lower plate incorporates at least one of a shutter lock mechanism and a write protect switch mechanism. The shutter lock mechanism blocks a shutter from being opened, and the write protect switch mechanism prevents data from being erased accidentally from the recording disk media.

20 Claims, 11 Drawing Sheets

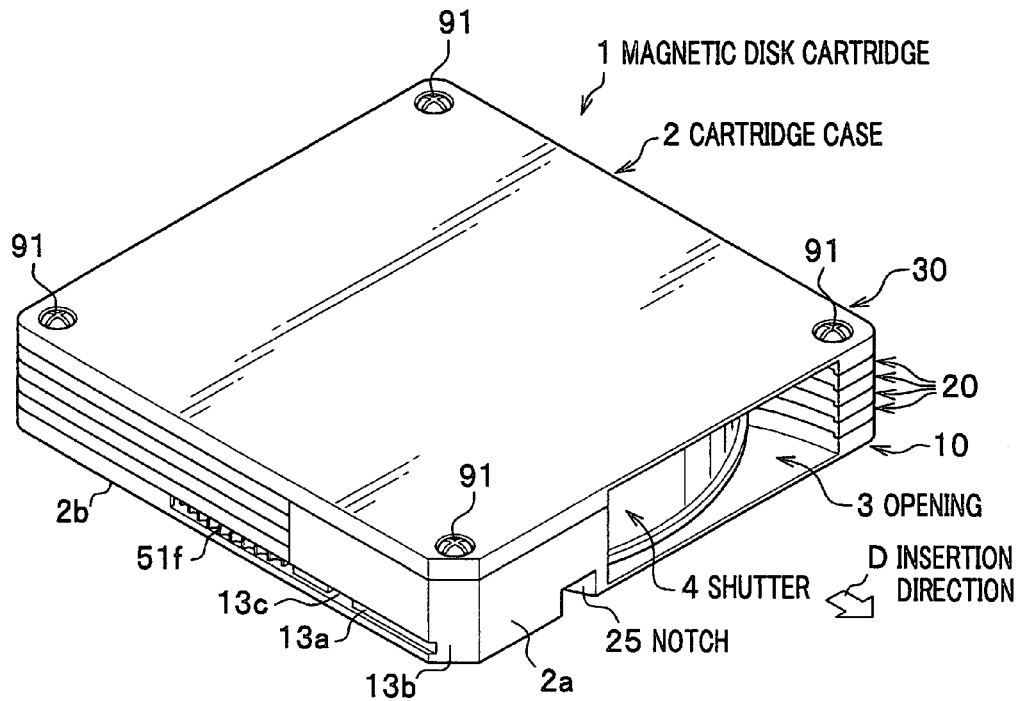
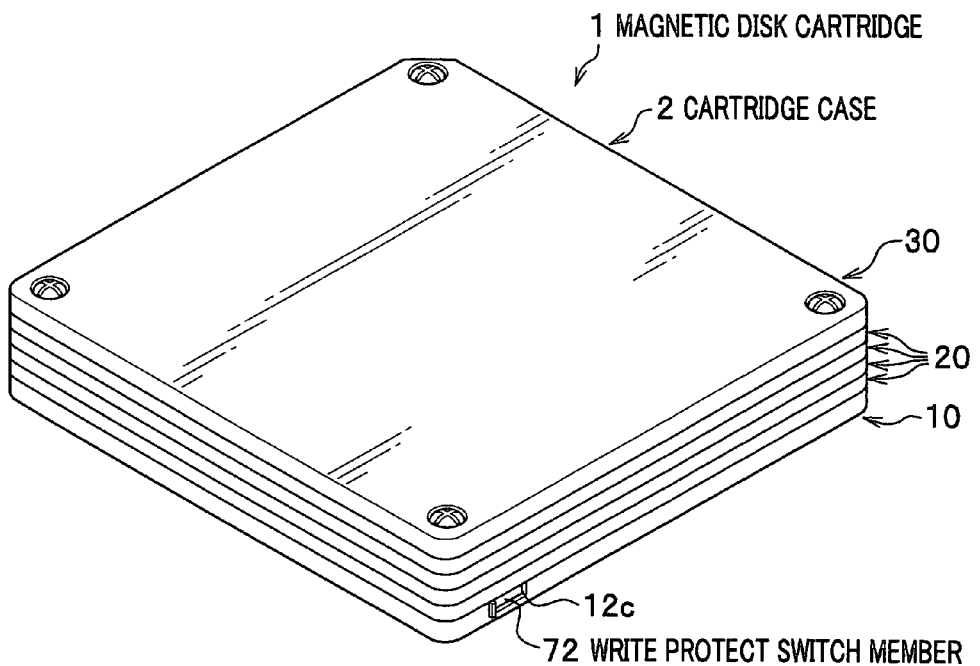

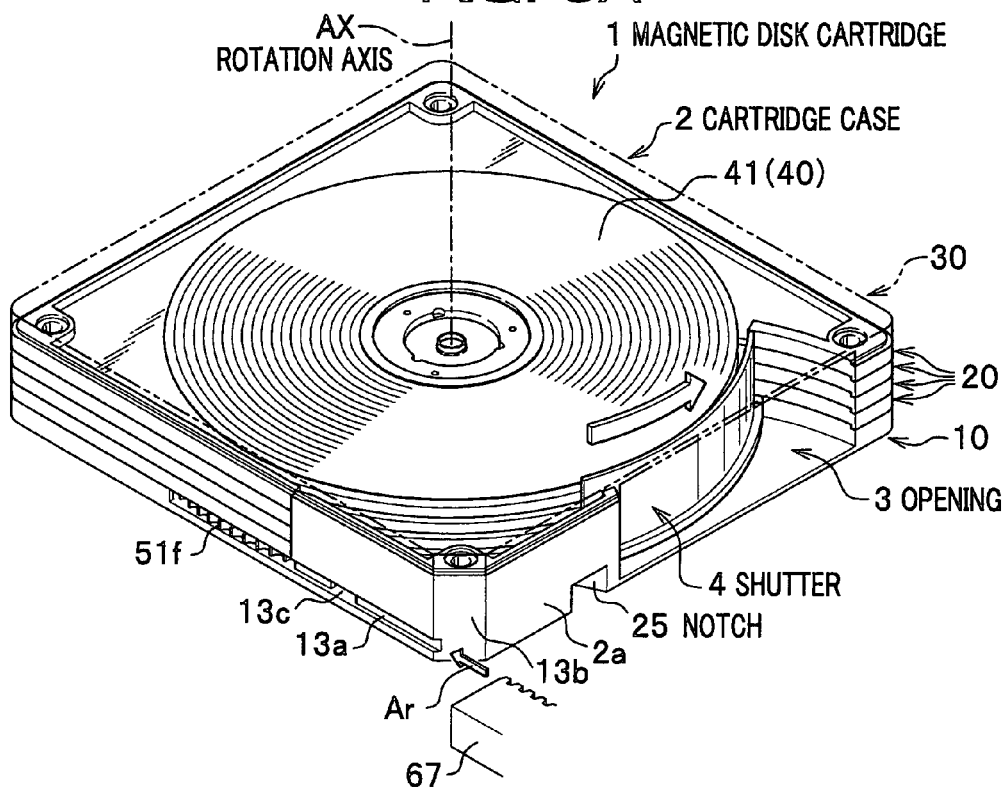
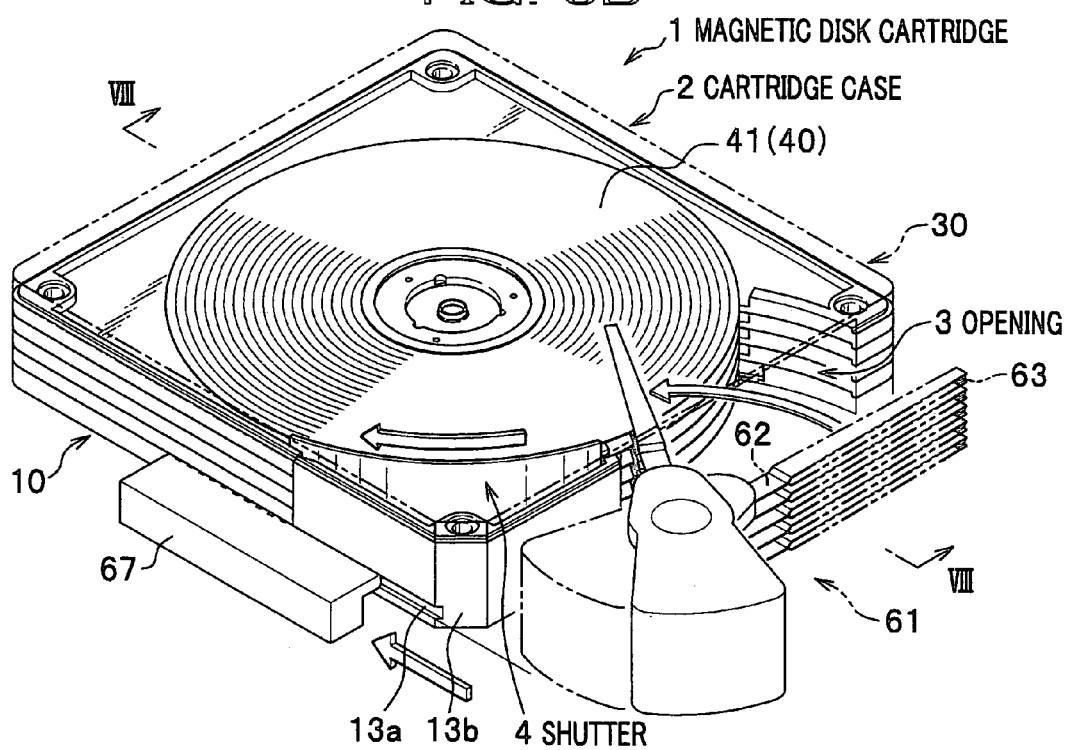

RECORDING DISK CARTRIDGE (HAVING A CARTRIDGE CASE) FOR STORING A PLURALITY OF FLEXIBLE RECORDING MEDIA INTEGRALLY AND ROTATABLY

BACKGROUND OF THE INVENTION

1. Field of the Invention

The present invention relates to a recording disk cartridge comprising a plurality of flexible recording disk media.

2. Description of the Related Art

Conventionally, as a recording disk medium, a flexible recording disk medium is known where a magnetic layer is formed on both faces of a disc-form support body consisting of a flexible material such as a polyester sheet. Although the magnetic disk medium has a merit of speedily accessing data in comparison with a magnetic tape, on the other hand, it has a demerit of a memory capacity being small because a recording area thereof is small.

In order to solve the demerit of the flexible magnetic disk medium, it is conventionally disclosed a magnetic disk cartridge for housing a plurality of magnetic disk media in one cartridge case (for example, see US2003/0231427).

In this connection, because a flexible magnetic disk medium is low in rigidity thereof, there is a problem that the medium tends to vibrate in a vertical direction for a recording face when rotated. Therefore, in an invention of US2003/0231427 each magnetic disk medium is made a configuration of being pinched by shutters. Thus by arranging plate members of high rigidity such as the shutters in a vicinity of the magnetic disk medium, the recording face can be stabilized because the medium becomes along the plate members, accompanied with a rotation of the medium.

However, because a magnetic disk cartridge of JP 2004-22011A is configured of movable shutters arranged by four for one magnetic disk medium, there is a problem that the cartridge is complicated in a structure thereof and is difficult to keep a parallelism to the medium. In addition, because the magnetic disk cartridge is mass produced goods, it is preferable to be excellent in assembling ability and productivity. Furthermore, the magnetic disk cartridge is preferable to be high in a degree of freedom in a design change so as to easily set a plurality of kinds thereof where number of magnetic disk media is made three, five, and the like.

In addition, such a magnetic disk cartridge is required to have functional components, such as a shutter lock member and a write protect switch member. The shutter lock member locks/releases the shutters when the cartridge is unused or used. The write protect switch member prevents the accidental erase of data from the cartridge. To attach these members to the cartridge, they need to be positioned not to interfere with the access of a disk drive to the cartridge when the cartridge is loaded into the disk drive. Furthermore, the members never affect the assembly capacity and the design change of the cartridge.

Taking into the above description, the present invention has been conceived. An object of the present invention is to provide a simple recording disk cartridge with excellent assembly and production capacities. An additional object of the present invention is to provide a recording disk cartridge which allows for the change of the design, such as the change of the number of recording disk media, and which is equipped with functional components being arranged not to affect the assembly capacity and the design change.

SUMMARY OF THE INVENTION

According to an aspect of the present invention, there is provided, a recording disk cartridge including:
a cartridge case including
(a) a plurality of flexible recording disk media being contained within in an integrally rotatable fashion;
(b) a lower plate forming a lower wall of the cartridge case, the lower wall being placed parallel to the recording disk media;
(c) one or more inner plates being fixed on the lower plate with being stacked, and partitioning the recording disk media; and
(d) an upper plate being fixed on the inner plates, and forming an upper wall of the cartridge case.

Further, the lower plate includes at least one of a shutter lock mechanism and a write protect switch mechanism. The shutter lock mechanism blocks a shutter from being opened, and the write protect switch mechanism prevents data from being erased accidentally from the recording disk media. In addition, the shutter opens or closes an opening through which a head of a disk drive accesses an interior of the cartridge case, and the shutter and the opening are formed on the cartridge case.

Due to the above structure, in the recording disk cartridge of the present invention, the cartridge case is assembled by stacking the lower plate, inner plates and upper plate in this order. Accordingly, the inner plate and recording disk medium can be handled as a single unit, and the individual recording disk media can be the same component, thereby enhancing its production capacity. In addition, in an assembly line, the lower plate or the inner plate can be used as a tray when the recording disk media are transferred, so that the media is prevented from being damaged and getting dirty, and the assembly quality is enhanced. In order to change the number of the media, the number of the inner plates simply needs to be changed, thus making it possible to vary the specifications of the recording disk cartridge easily. The inner plates, which serve as partitions, are secured as a part of the cartridge case. This facilitates improving the parallel accuracy of the inner plates and the recording disk media. As a result, it is possible to rotate the recording disk media with stability at a high speed, for example, at 2000 to 8000 rpm.

In this recording disk cartridge, because of the structure that at least one of the shutter lock member and the write protect switch mechanism is placed on the lower plate, when the structure of the recording disk cartridge is changed, the shapes of the inner plates and the upper plate are not required to be varied greatly. Moreover, when the recording disk cartridge is assembled, the shutter lock member and the write protect switch mechanism can be transferred with being mounted on the lower plate. Furthermore, the number of the inner plates is changed, whereby the number of the recording disk media is varied. Accordingly, it is possible to arrange the shutter lock member and the write protect switch mechanism without decreasing the assembly and production capacities and the flexibility of the design, greatly.

In the above recording disk cartridge, it is preferable that both the shutter lock member and the write protect switch mechanism are arranged on the lower plate.

In the recording disk cartridge, an access portion to be accessed by a disk drive is provided on the lower plate. Owing to this structure, each of the inner plates does not need to be equipped with any access portion. This means that the access portion is provided not to interfere with the inner plates, thus enhancing the flexibility of the design, such as the arrangement of the recording disk media.

In conclusion, with this recording disk cartridge, it is possible to improve its assembly and production capacities, as well as the flexibility of the design.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein:

FIG. 1A is a perspective front view depicting a magnetic disk cartridge according to an embodiment of the present invention;

FIG. 1B is a perspective rear view depicting the magnetic disk cartridge according to the embodiment;

FIG. 3A is an external perspective view of the magnetic disk cartridge with a shutter closed;

FIG. 3B is an external perspective view with the shutter opened;

DETAILED DESCRIPTION OF THE EXEMPLARY EMBODIMENTS OF THE INVENTION

Figure 2:
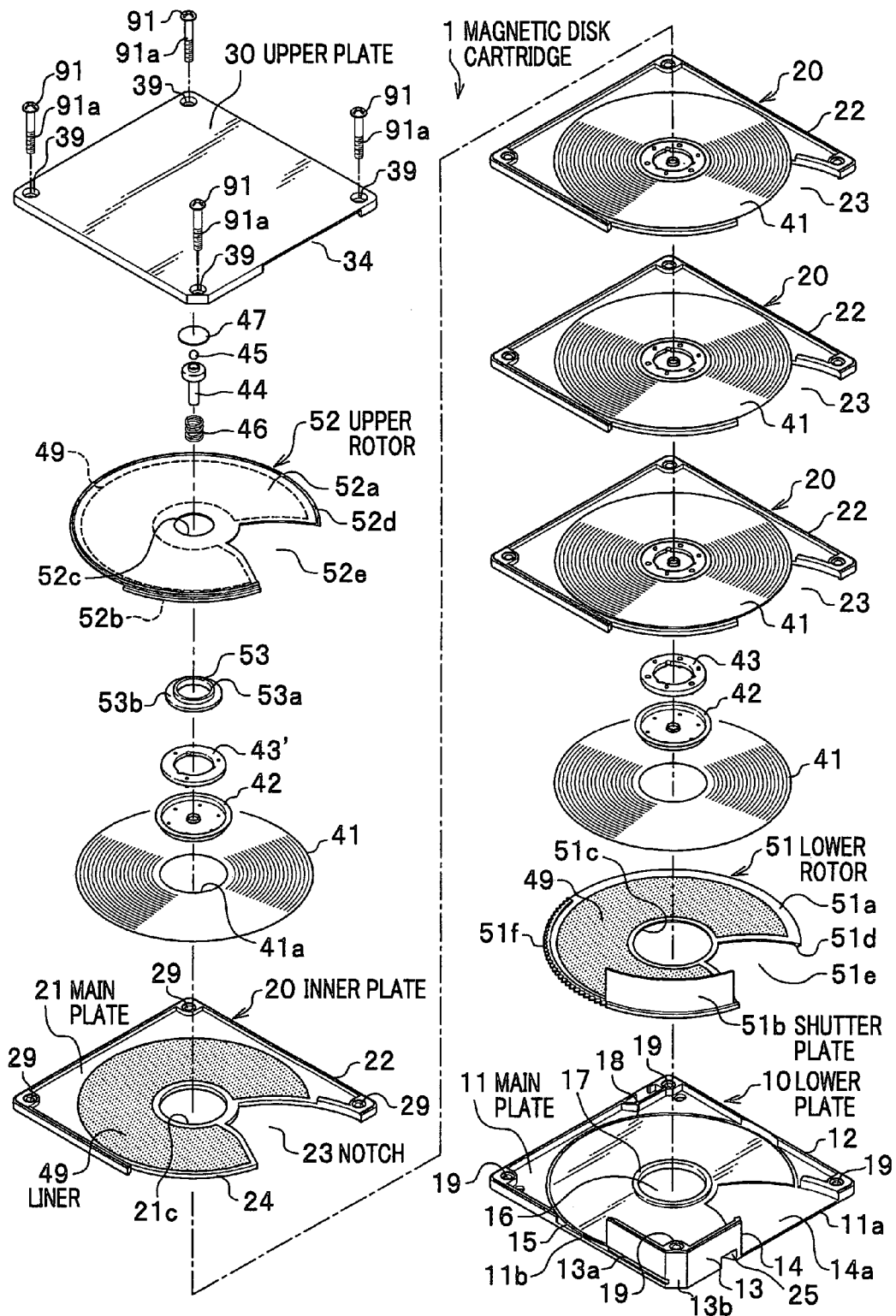
FIG. 2 is an exploded perspective view of the magnetic disk cartridge according to the embodiment.

Here will be described an embodiment of the present invention in detail, referring to drawings as needed. In the embodiment will be described a case of adopting a magnetic disk medium as an example of a recording disk medium.

Meanwhile, in a description below, with respect to up/down directions, making it a standard a typical use state of the magnetic disk cartridge, vertical directions for faces of magnetic disk media are called the up/down directions for convenience.

As shown in FIG. 1, in a magnetic disk cartridge 1 of an example of a recording disk cartridge are stacked a lower plate 10 for configuring a lower wall thereof; a plurality of, for example, four inner plates 20, and an upper plate 30 for configuring an upper wall thereof in this order; these are fastened and fixed with four screws 91; and thereby a cartridge case 2 (see FIG. 2A) is configured.

As shown in FIG. 2, between the lower plate 10 and the lowermost inner plate 20, between any adjacent two of the four inner plates 20, and between the uppermost inner plate 20 and the upper plate 30 is arranged a magnetic disk medium 41, respectively. Each magnetic disk medium 41 is a disc form having an opening 41a at center thereof, and a center core 42 made of metal is affixed at rim of the opening 41a. It is designed that any adjacent two center cores 42 are engaged by spacers 43, 43', and that five magnetic disk media 41 (the magnetic disk media 41 stacked and integrated are assumed to be a disk stack 40 (see FIG. 8)) are integrally rotated.

In each of the inner plates 20 is formed a rib 22 for abutting with upper/lower plates at a peripheral rim of a flat main plate 21. Part of a right near side of each of the inner plates 20 in FIG. 1 forms a notch 23 so that magnetic heads 63 (see FIG. 8) can easily move onto the magnetic disk media 41. At the portion of the notch 23 is not formed the rib 22, and therefore, when the inner plates 20 are stacked up, an opening 3 is formed on a side face of the cartridge case 2 as shown in FIG. 1A. The magnetic disk cartridge 1 is inserted into a magnetic disk drive 6 (see FIG. 11A) from a front surface 2a. Note that the magnetic disk drive 6 refers to "disk drive" herein.

The opening 3 is opened/closed by a shutter 4 that rotates coaxially with the disk stack 40, as shown in FIG. 3A. As shown in FIG. 2, the shutter 4 is configured by combining a lower rotor 51 and an upper rotor 52.

Next will be described each member in more detail.

As shown in FIG. 2, the lower plate 10 is designed at a peripheral rim of a main plate 11 of a substantially square to mainly form a side wall 13 and a rib 12 for abutting with a lower face of the rib 22 of the lowermost inner plate 20. The side wall 13 is vertically provided in a predetermined range, for example, around one third range of one edge, from one corner of the main plate 11 (near side corner in FIG. 2), and is formed approximately in height of the inner plates 20 stacked.

A sector portion toward a center of the main plate 11 from one edge 11a (one edge of right near side in FIG. 2) continuing into the side wall 13 of the main plate 11 is designed to form a depression 14a lowered by one step, not to form the rib 12 at the peripheral rim of the main plate 11, and to become an opening 14. Thus it becomes easy for the magnetic heads 63 to proceed into the cartridge case 2.

An approximately central one third range of the other edge 11b (one edge of left near side in FIG. 2) continuing into the side wall 13 of the main plate 11 is designed not to form the rib 12 but to become an opening 15 so that a gear 51f of the lower rotor 51 described later can be exposed. In addition, outside the side wall 13 of the other edge 11b is formed a groove 13a along a periphery of the lower plate 10, continuing into the opening 15. The groove 13a is designed to be a passage where a shutter open gear 67 (see FIG. 3A) of a magnetic disk drive proceeds in a direction shown in an arrow Ar of FIG. 3A and enters in the opening 15 in order to engage in the gear 51f.

The rib 12 is formed so as to protrude upward across whole periphery except the side wall 13 and the openings 14, and 15 out of a peripheral rim of the main plate 11. At center of the main plate 11 is formed a circular opening 16 for exposing the center core 42 provided inside the lowermost magnetic disk medium 41. At upper rim of the opening 16, across all periphery thereof is formed a rib 17 outside which a central opening 51c formed at center of the lower rotor 51 fits. The rib 17 rotationally freely supports the lower rotor 51.

In addition, on an upper face (back face) of the main plate 11 is formed a circular lower rotor support groove 18 at a position corresponding to peripheral rim of the lower rotor 51. The lower rotor support groove 18 rotationally freely supports the lower rotor 51 coaxially with the magnetic disk media 41 by engaging in a rib 51d (see FIG. 8) formed downward at a peripheral rim of the lower rotor 51.

In addition, at four corners of the main plate 11 are formed screw holes 19 where female threads are formed, respectively, with penetrating through the up/down directions.

Figure 4A:
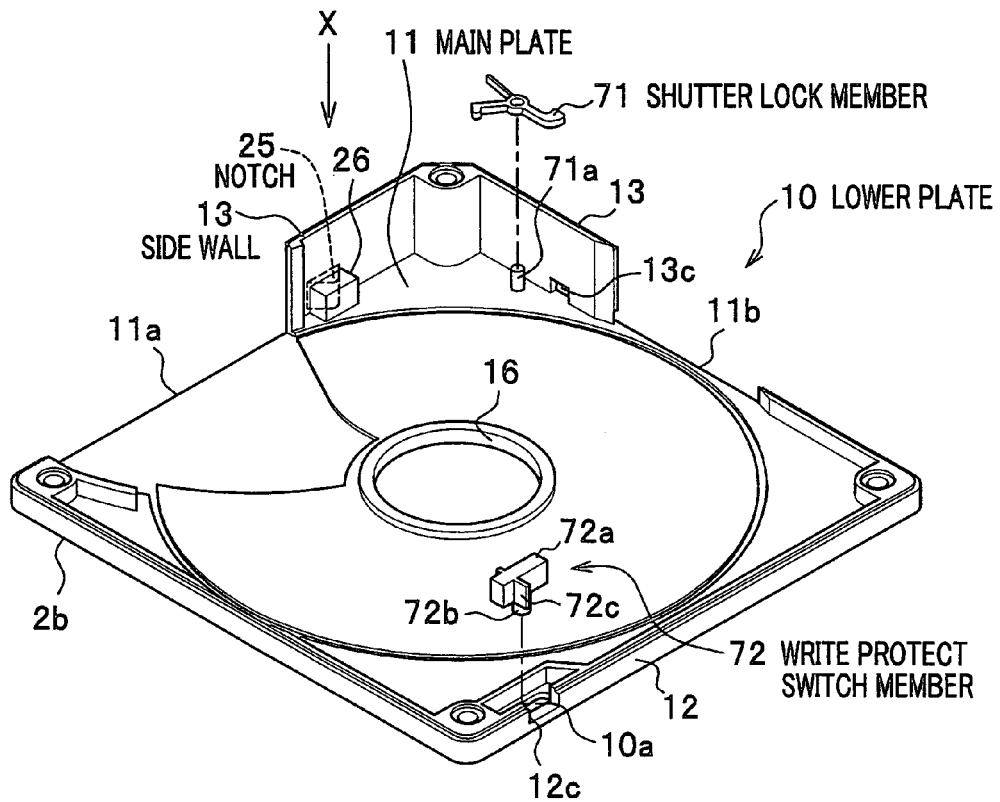
FIG. 4A is a perspective view depicting a lower plate according to the embodiment.
Figure 4B:
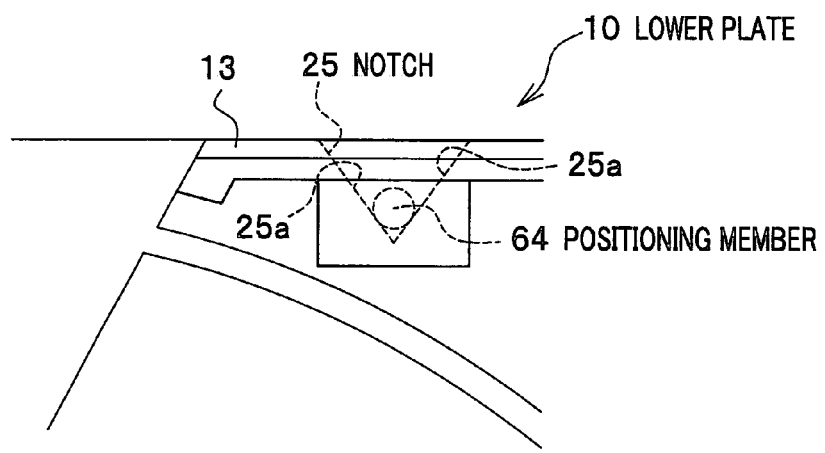
FIG. 4B is a partially enlarged view depicting the lower plate, seen in an X direction of FIG. 4A.

As shown in FIG. 1A, a notch 25 is formed near the opening 3 and in the side wall 13 of the lower plate 10 constituting the cartridge case 2. As shown in FIG. 4A, a rectangular prism 26 is formed over the side wall 13 and the main plate 11, and they are all integrated. Furthermore, the notch 25 is formed extending from the side wall 13 to the interior of the rectangular prism 26. This notch 25 is a V-shaped notch as shown in FIG. 4B, and it has a shape to receive a positioning member 64 of the magnetic disk drive 6 with sides 25a and 25a (see FIG. 11B). As shown in FIG. 1A, the lower edge of the notch 25 and the lower face of the lower plate 10 (cartridge case 2) are integrated. This notch 25 is accessed by the positioning member 64 of the magnetic disk drive 6, and it constitutes "access portion" with a chamfered portion 13b (see FIG. 2), herein.

As shown in FIG. 2, the chamfered portion 13b is formed on the side wall 13 of the lower plate 10. This chamfered portion 13b has a shape to fit a receiving member 68 (see FIG. 11B) of the magnetic disk drive 6, when the magnetic disk cartridge 1 is loaded into the magnetic disk drive 6.

Due to the structure that the chamfered portion 13b is formed at the right front corner in FIG. 1, an operator is easy to identify visually an insertion direction in which the magnetic disk cartridge 1 is inserted into the magnetic disk drive 6, and the front or back face of the magnetic disk cartridge 1. If the chamfered portion 13 does not fit the receiving member 68 when the magnetic disk cartridge 1 is inserted into the magnetic disk drive 6, in other words, if the magnetic disk cartridge 1 is inserted into the magnetic disk drive 6 in a direction other than the insertion direction D or reversely, the magnetic disk cartridge 1 is not accommodated within the magnetic disk drive 6. Accordingly, the magnetic disk drive 6 can identify the insertion manner of the magnetic disk cartridge 1, depending on whether or not the receiving member 68 can fit the chamfered portion 13b. This chamfered portion 13b makes it possible to recognize the correct insertion of the magnetic disk cartridge 1, and constitutes "access portion" with the notch 25, herein.

As shown in FIG. 4A, a hole 13c is formed passing through the side wall 13, and it communicates with the groove 13a (see FIG. 1A).

Moreover, as shown in FIG. 4A, a shutter lock member 71 and a write protect switch member 72 are provided on the lower plate 10.

Figure 5:
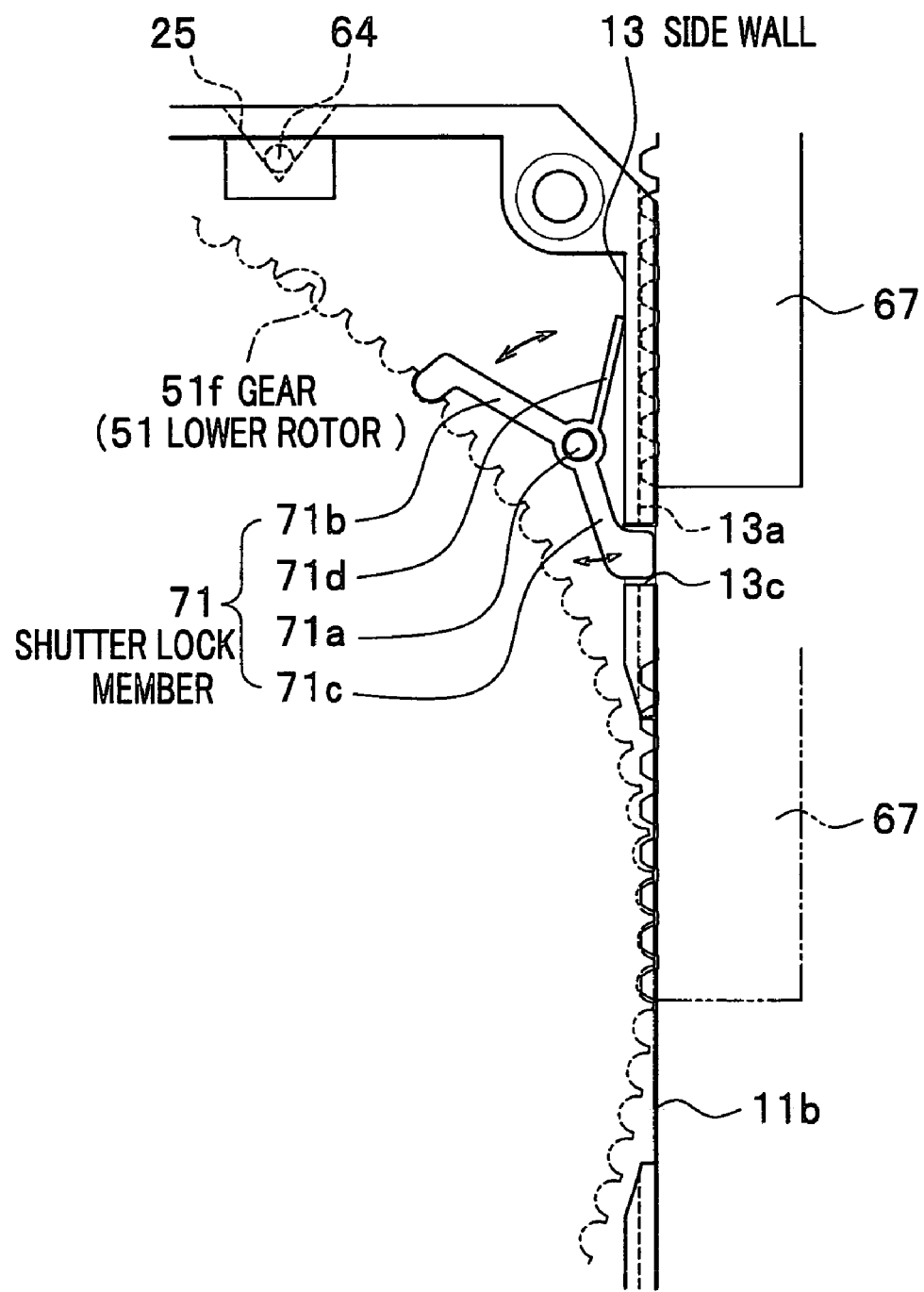
FIG. 5 is a plan view depicting a shutter lock member according to the embodiment attached to the lower plate.

The shutter member 71 is attached to a shaft 71a protruding upward from a main plate 11, and it can rotate around the shaft 71a. As shown in FIG. 5, the shutter member 71 includes a first arm 71b extending from the shaft 71a to a gear 51f (described later) a second arm 71c extending from the shaft 71a to the hole 13c formed in the side wall 13, and a plate spring 71d extending from the shaft 71a to the inner side of the side wall 13. Furthermore, the end of the first arm 71b mates with the gear 51f, the end of the second arm 71c fits into the hole 13c and is accommodated in the groove 13a, and the end of the plate spring 71d abuts against the inner side of the side wall 13.

Once the end of the second arm 71c is pushed in the left direction of FIG. 5, the plate spring 71d is bent, and the above shutter lock member 71 then rotates around the shaft 71a clockwise by a short amount. This clockwise rotation of the shutter lock member 71 allows the end of the first arm 71b to move away from the gear 51f. Consequently, the lower rotor 51 having a shutter plate 51b (see FIG. 2) rotates. If the pushing of the end of the second arm 71c is released, then the end of the first arm 71b returns to mate with the gear 51f due to the elasticity of the plate spring 71d. Then, the lower rotor 51 is blocked from rotating, thereby locking the shutter 4 (see FIG. 3A).

Figure 6:
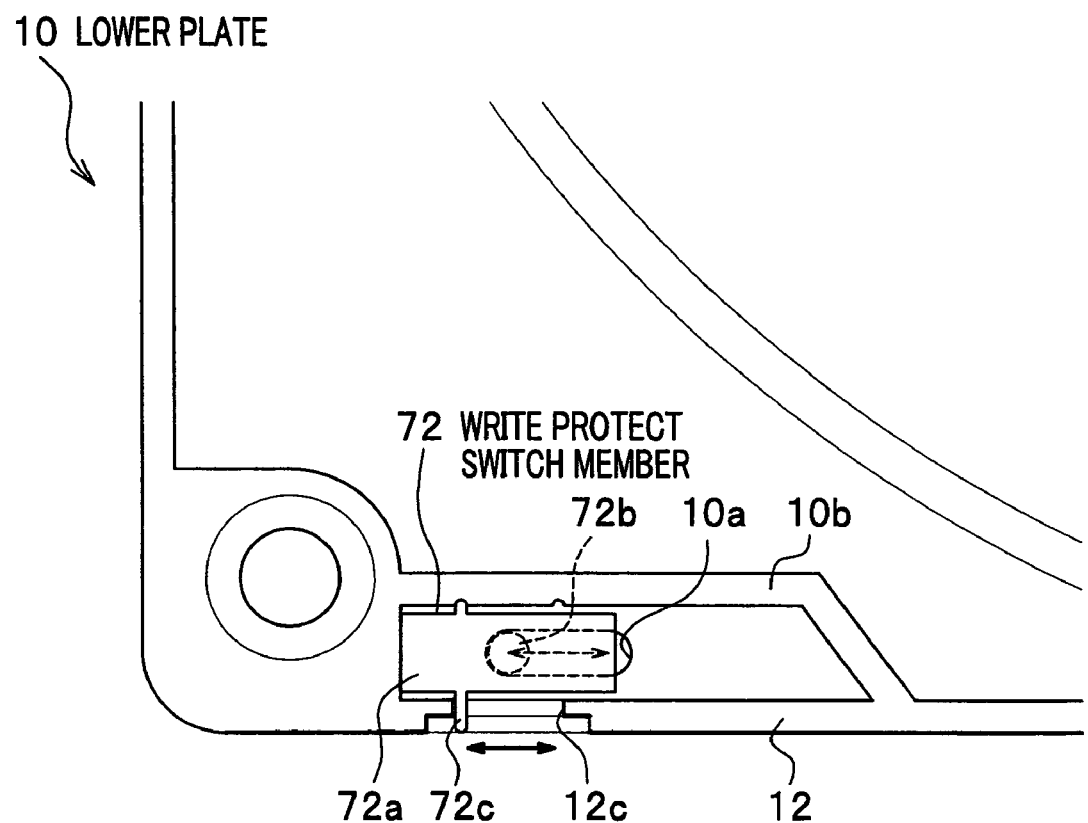
FIG. 6 is a plan view depicting a write protect switch member according to the embodiment attached to the lower plate.

The write protect switch member 72 may have a known structure such as that of a write protect switch member for magnetic tape cartridges in compliance with the LTO standard. Specifically, as shown in FIG. 4A, the write protect switch member 72 includes a main body 72a, a lower projection 72b extending downward from the main body 72a, and a side projection 72c extending laterally from the main body 72a. In FIG. 6, the lower projection 72b is inserted into an elliptic hole 10a formed at the left corner of the lower plate 10, and the main body 72a slides along a guide rib 10b. Furthermore, the side projection 72c protrudes from the lower plate 10 through a window 12c.

The side projection 72c moves laterally in the window 12c, so that the lower projection 72b travels laterally in the elliptic hole 10a. Accordingly, the magnetic disk drive 6 (see FIG. 11A) can identify whether or not it is possible to record data onto the magnetic disk medium 41 (FIG. 11A), depending on the position of the side projection 72b within the elliptic hole 10a. In this case, a mechanism by which the magnetic disk drive 6 senses the position of the side projection 72b may be a known mechanism such as one used typically in magnetic tape drives or flexible disk drives. With this mechanism, the lower projection 72b can be moved.

The main plate 21 of each of the inner plates 20 is substantially a square, and a portion corresponding to one of four corners of the square is designed to be an arc (arc portion 24) one size larger than the magnetic disk medium 41. At one edge (right near side in FIG. 1A) continuing into the arc portion 24 is formed the notch 23 into a sector. The rib 22 protrudes the up/down directions and is formed across all periphery except the arc portion 24 and the notch 23 out of periphery rim of the main plate 21. At center of the main plate 21 is formed a central opening 21c for enabling the upper center core 42 to be exposed and to be coupled with the lower center core 42.

In addition, at three corners of the main plate 21, with penetrating through the three corners in the up/down directions, are formed holes 29 through which screw shaft portions 91a of the screws 91 are inserted, respectively.

Figure 7:
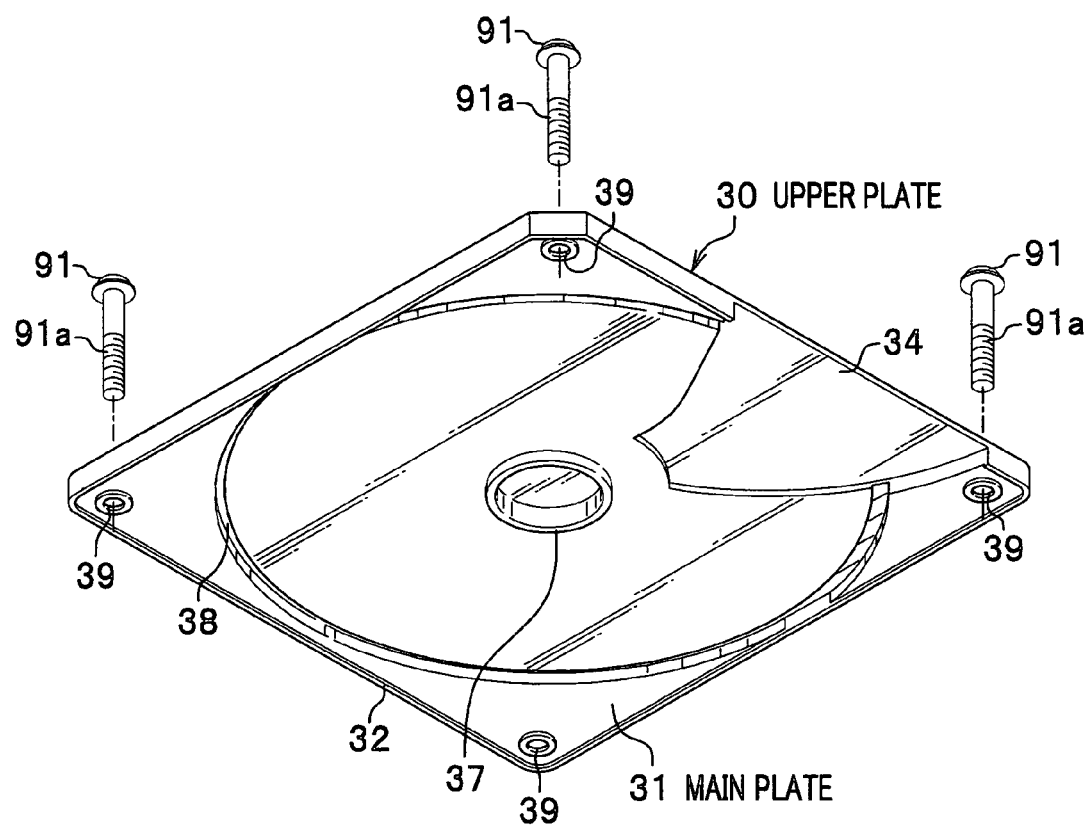
FIG. 7 is a perspective view depicting a back of an upper plate according to the embodiment.

As shown in FIG. 2, the upper plate 30 is formed substantially symmetric to the lower plate 10. As shown in FIG. 7, in the upper plate 30, on a substantially square main plate 31 are formed a depression 34 corresponding to the depression 14a (see FIG. 2), a rib 37 corresponding to the rib 17 (see FIG. 2), and an upper rotor support groove 38 corresponding to the lower rotor support groove 18 (see FIG. 2). Meanwhile, at center of the main plate 31 are not formed an opening and a side wall corresponding to the side wall 13 (see FIG. 2).

In addition, at a peripheral rim of the main plate 31, across all periphery except the depression 34 is formed a rib 32 protruding downward.

In addition, at four corners of the main plate 31 are respectively formed holes 39 that enables the screw shaft portions 91a of the screws 91 to be penetrated therethrough.

The lower rotor 51 is designed so that: a central opening 51c, a notch 51e, a rib 51d, and the gear 51f are formed on a ring-form lower rotor plate 51a substantially same as the magnetic disk media 41; and a shutter plate 51b is vertically provided at the peripheral rim of the lower rotor plate 51a, as shown in FIG. 2. The central opening 51c is formed as a circle fitting outside the rib 17, the notch 51e is formed as a sector corresponding to the depression 14a. In addition, the rib 51d is provided downward at a peripheral rim of a lower face of the lower rotor plate 51a, corresponding to the lower rotor support groove 18.

The shutter plate 51b is a blocking member for blocking the opening 3 (see FIG. 3A) and the disk stack 40 (see FIG. 3A) and is vertically provided along the peripheral rim of the lower rotor plate 51a with neighboring the notch 51e. The gear 51f is an engaged portion for opening/closing the shutter 4 (see FIG. 3A) from outside of the magnetic disk cartridge 1, and is formed at a peripheral rim of the lower rotor plate 51a within a predetermined range with neighboring the shutter plate 51b.

As shown in FIG. 2, the upper rotor 52 is designed to be substantially symmetric to the lower rotor 51: the upper rotor 52 comprises an upper rotor plate 52a similar to the lower rotor plate 51a; on the upper rotor plate 52a are formed a central opening 52c fitting outside the rib 37 of the upper plate 30, a notch 52e corresponding to the depression 34 (see FIG. 7), and a rib 52d corresponding to the upper rotor support groove 38 (see FIG. 7). In addition, at a portion adjacent to the notch 52e of a peripheral rim of the upper rotor plate 52a is formed a shutter groove 52b, corresponding to the shutter plate 51b of the lower rotor 51. The lower rotor 51 and the upper rotor 52 are designed to integrally rotate by the shutter groove 52b (see FIG. 9) and upper end rim of the shutter plate 51b engaging.

The upper rotor 52 is rotationally freely supported by the upper plate 30 by the central opening 52c fitting outside the rib 37 of the upper plate 30, and the rib 52d engaging in the upper rotor support groove 38. Meanwhile, the upper rotor 52 is prevented from dropping from the upper plate 30 by a stop member 53. The stop member 53 comprises a cylindrical portion 53a inserted in the rib 37 (see FIG. 7) and a flange 53b formed at one end of the cylindrical portion 53a; the cylindrical portion 53a is inserted in the central opening 52c from a lower side of the upper rotor 52 and is fixed at the rib 37 by ultrasonic welding, adhesion, and the like.

Figure 9:
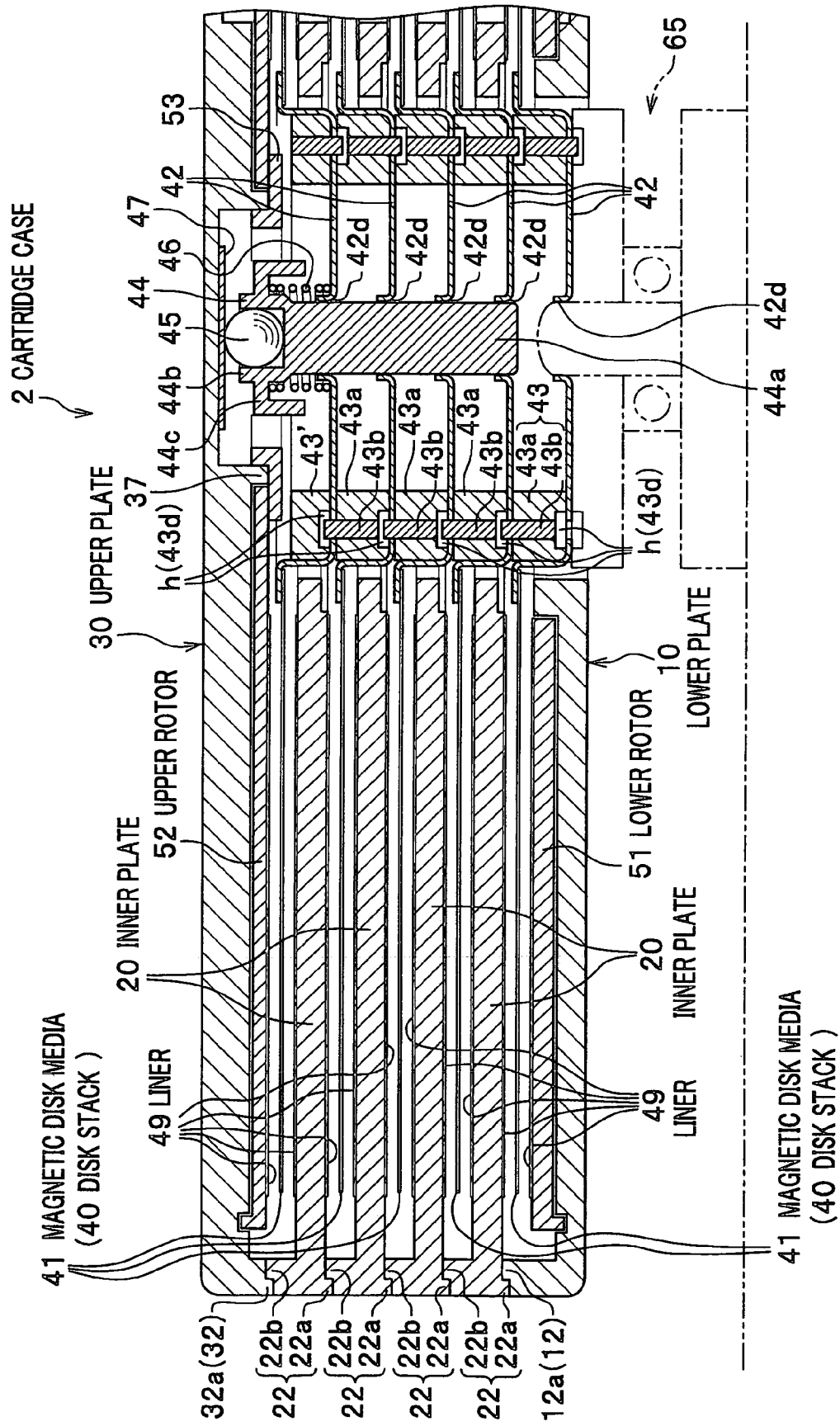
FIG. 9 is a partially enlarged view of FIG. 8.

As an enlarged section drawing shown in FIG. 9, an upper face of the lower rotor 51, upper and lower faces of the inner plates 20, and a lower face of the upper rotor 52 are faces opposing the magnetic disk media 41, where liners 49 are affixed across portions opposing the media 41, respectively.

The liners 49 consist of, for example, a non-woven cloth such as a polyester fiber and a blended fabric fiber of rayon and polyester.

Next will be described a stack structure of the lower plate 10, the inner plates 20, and the upper plate 30.

In the rib 12 of the lower plate 10, as shown in FIG. 9, an inside thereof is formed higher by one step than an outside thereof, and thereby a male type step portion 12a is formed; each rib 22 of the inner plates 20 forms a female type step portion 22a protruding downward at outermost periphery, and thus a periphery of the male type step portion 12a and an inner perimeter of the female type step portion 22a become able to be fitted. In addition, when the lower plate 10, the inner plates 20, and the upper plate 30 are fastened by the screws 91 (see FIG. 1), an upper face of the male type step portion 12a and a corresponding portion of a lower face of the lowermost inner plate 20 are designed to be contacted. Thus, because the rib 12 of the lower plate 10 and the rib 22 of the inner plate 20 are sealingly abutted and fitted each other, an invasion of dust into the cartridge case 2 from outside is prevented.

Similarly, adjacent two of the inner plates 20, and the uppermost inner plate 20 and the upper plate 30 are stacked by being sealingly abutted and fitted each other. In other words, on an upper face of each of the inner plates 20 is formed a male type step portion 22b where an inside of the upper face is formed higher by one step; at a rib 32 of the upper plate 30 is formed a female type step portion 32a of which outermost periphery protrudes downward by one step. And the male type step portion 22b of one inner plate 20 and the female type step portion 22a of an upper adjacent inner plate 20 are sealingly abutted and fitted each other; the male type step portion 22b of the uppermost inner plate 20 and the female type step portion 32a of the upper plate 30 are sealingly abutted and fitted, and stacked. Thus any adjacent two of the ribs 12, 22, 32 are sealingly abutted and fitted each other, and dust from outside is prevented from invading into the cartridge case 2. In addition, as soon as the lower plate 10, the inner plates 20, and the upper plate 30 are stacked, the side wall 13 of the cartridge case 2 is configured.

In addition, both of the female type step portion 22a and the male type step portion 22b protrude from the main plate 21 beyond a thickness of the liner 49. Therefore, after affixing the liners 49 on the inner plates 20 and making an assembly, then even if placing it on a work bench, the liners 49 do not contact the work bench, and accordingly, are not contaminated with dust and the like.

Such a configuration of the cartridge case 2 by stacking the inner plates 20 facilitates a change of the number of the magnetic disk media 41; although a height change of the side wall 13 and that of the shutter plate 51b are requested, a number of housing units of the magnetic disk media 41 formed within the cartridge case 2 can be changed merely by changing the number of the inner plates 20.

Next will be described the magnetic disk media 41 and a stack structure thereof. The magnetic disk media 41 are ones where magnetic paint is coated on both faces of a resin sheet, such as polyester.

Figure 10:
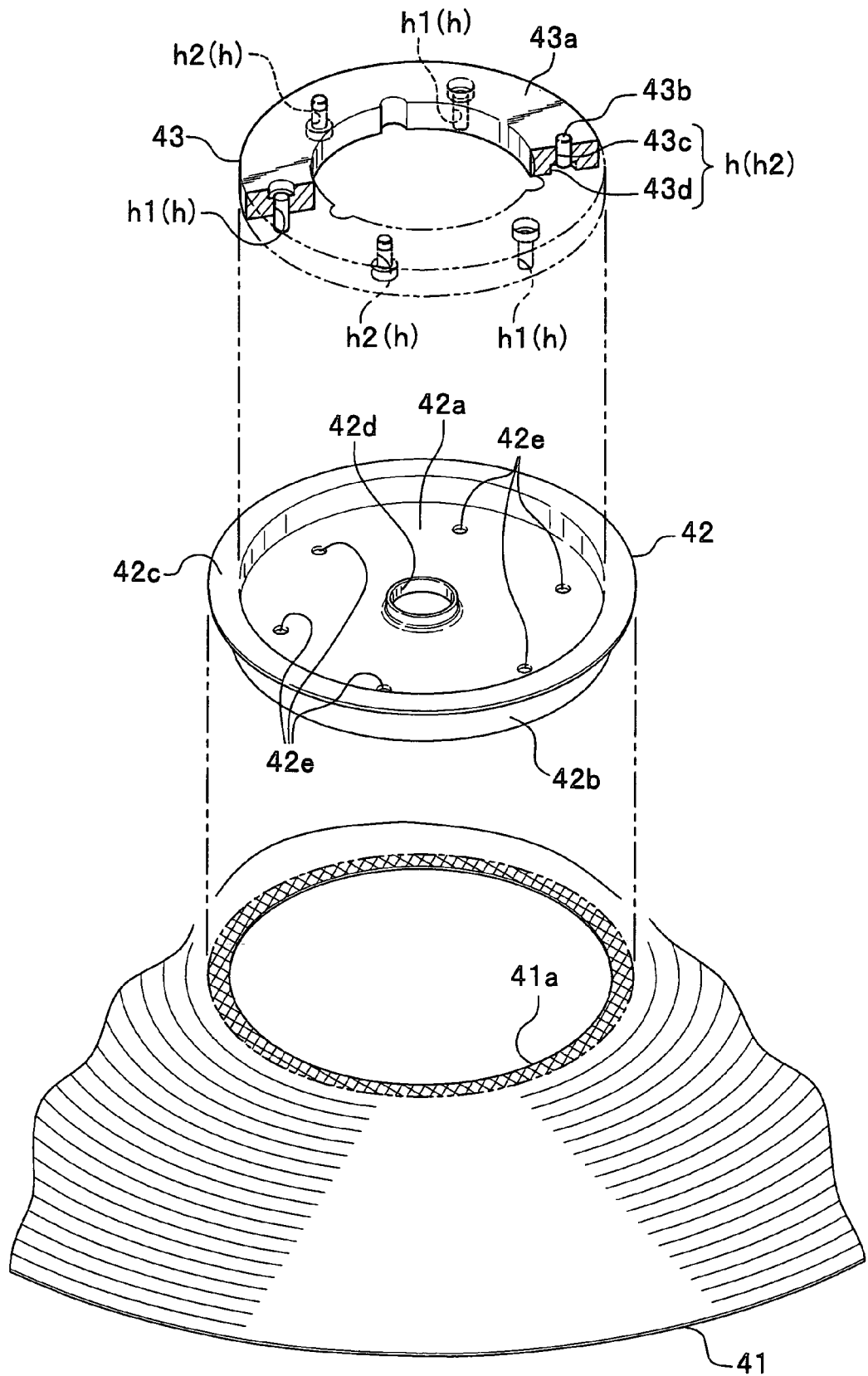
FIG. 10 is an exploded perspective view depicting a stacked structure of magnetic disk media according to the embodiment.

As shown in FIG. 10, each of the center cores 42 is one substantially made a hat form with draw forming a metal plate by press: the center core 42 is mainly configured of a circular bottom plate 42a, a low cylindrical side wall 42b rising from peripheral rim of the bottom plate 42a, and a flange 42c widening in an outer diameter direction from an upper end of the side wall 42b. At center of the bottom plate 42a is formed a center hole 42d, and at rim of the plate 42a are formed six small holes 42e at a distance of 60 degrees, making the center hole 42d a center thereof.

A spacer 43 is provided between adjacent center cores 42, keeps a distance of each of the center cores 42, stops a rotation between each of the center cores 42, and functions so that the stacked magnetic disk media 41 integrally rotate. The spacer 43 is mainly configured of a main body portion 43a shaped like a ring from a resin and metallic pins 43b pressed into the main body portion 43a. In the main body portion 43a are formed six penetration holes h at positions corresponding to the small holes 42e of the center core 42, wherein each of the penetration holes h consists of a small diameter hole portion 43c, where the pin 43b is pressed, and a large diameter hole portion 43d that is coaxial with and slightly larger in diameter than the small diameter hole portion 43c. The six penetration holes h are designed to be upside down in any two adjacent ones. In other words, penetration holes h2 of both adjacent penetration holes h1, where each the large diameter hole portion 43d is positioned at an upper side thereof, are arranged so that the large diameter hole portion 43d is positioned at a lower side thereof.

Into each of the small diameter portions 43c is pressed each one pin 43b from upper/lower sides thereof, one end of the pin 43b is positioned at a boundary of the large diameter hole portion 43*d* and the small diameter hole portion 43*c*, and the other end thereof protrudes outside the small diameter portion 43*c*. The large diameter hole portion 43*d* serves a function of a clearance at ends of pins 43*b* of adjacent spacers 43.

As shown in FIG. 9, such the spacers 43 are provided between adjacent center cores 42, respectively. One pin 43*b* protruding toward a lower side of each of the spacers 43 enters in a small hole 42*e* of one center core 42 at the lower side of the spacer 43, and stops a rotation relative to the center core 42 at the lower side. If there is another spacer 43 at a still lower side than the center core 42 at the lower side, a floating-up of the spacer 43 for the center core 42 is prevented by the pin 43*b* entering the large diameter hole portion 43*d* in the spacer 43 at the lower side. The other pin 43*b* protruding toward an upper side of the spacer 43 enters in a small hole 42*e* of the other center core 42 at the upper side of the spacer 43, and stops a rotation relative to the center core 42 at the upper side. If there is another spacer 43 at a still upper side than the center core 42 at the upper side, the top end of the pin 43*b* enters in the large diameter hole portion 43*d* in the spacer 43 at the upper side.

Meanwhile, because at an upper side the uppermost center core 42 has no center core 42 to stop a rotation thereof, at the upper side is arranged a thin top spacer 43' in thickness where the pin 43*b* is protruded only downward.

The magnetic disk media 41 thus stacked, namely, the disk stack 40, are stably supported in rotation by a coupling shaft 44, a bearing ball 45, a compression coil spring 46, and a center plate 47.

As shown in FIG. 9, the coupling shaft 44 lessens a central fluctuation between the center cores 42 stacked, holds the bearing ball 45 and the compression coil spring 46, and comprises a shaft portion 44*a*, a ball holding portion 44*b*, and a spring holding portion 44*c*. The shaft portion 44*a* is a columnar form that can be inserted through the center holes 42*d* of the center cores 42. At an upper end of the shaft portion 44*a* the ball holding portion 44*b* is formed into a cylindrical form with a bottom opening to an upper side thereof. A depth of the ball holding portion 44*b* is larger than a radius of the bearing ball 45, and therefore, the bearing ball 45 is stably held at the ball holding portion 44*b*. The spring holding portion 44*c* consists of a form where a cylindrical form with a bottom is turned down at a side of an outer diameter of the ball holding portion 44*b*, and the compression coil spring 46 is arranged in a cylindrical space between the shaft portion 44*a* and the spring holding portion 44*c*. Meanwhile, although a length of the coupling shaft 44 is arbitrary, in the embodiment it is one reaching the second center core 42 from the lowermost one; the center hole 42*d* of the lowermost center core 42 is opened so that a spindle 65 of a magnetic disk drive can proceed.

The center plate 47 is a slide member affixed at the center of an inner face of the upper plate 30, that is, on a flat face of an inside of the rib 37. The center plate 47 can be composed of, for example, a material excellent in sliding ability and abrasion resistance such as polyoxymethylene and ultra high molecular weight polyethylene.

Although the bearing ball 45 consists of a sphere made of, for example, steel used for a ball bearing, it may also be composed of a material excellent in sliding ability and abrasion resistance, for example, such as polytetrafluoroethylene and polyoxymethylene. The bearing ball 45 is arranged within the ball holding portion 44*b* of the coupling shaft 44, abuts with the bottom face of the ball holding portion 44*b*; and a center of an inner face of the upper plate 30, that is, the center plate 47 by a point contact, and rotationally supports the disk stack 40.

In the compression coil spring 46 one end (upper end) is held by the spring holding portion 44*c* of the coupling shaft 44; the other end (lower end) abuts with an upper face of the uppermost center core 42, and energizes the stacked center cores 42 to the side of the lower plate 10, that is, to the side of the spindle 65 of the magnetic disk drive. Thus the center cores 42 do not jounce within the cartridge case 2, and the fluctuation of the magnetic disk media 41 is prevented in rotation thereof.

Figure 11A:
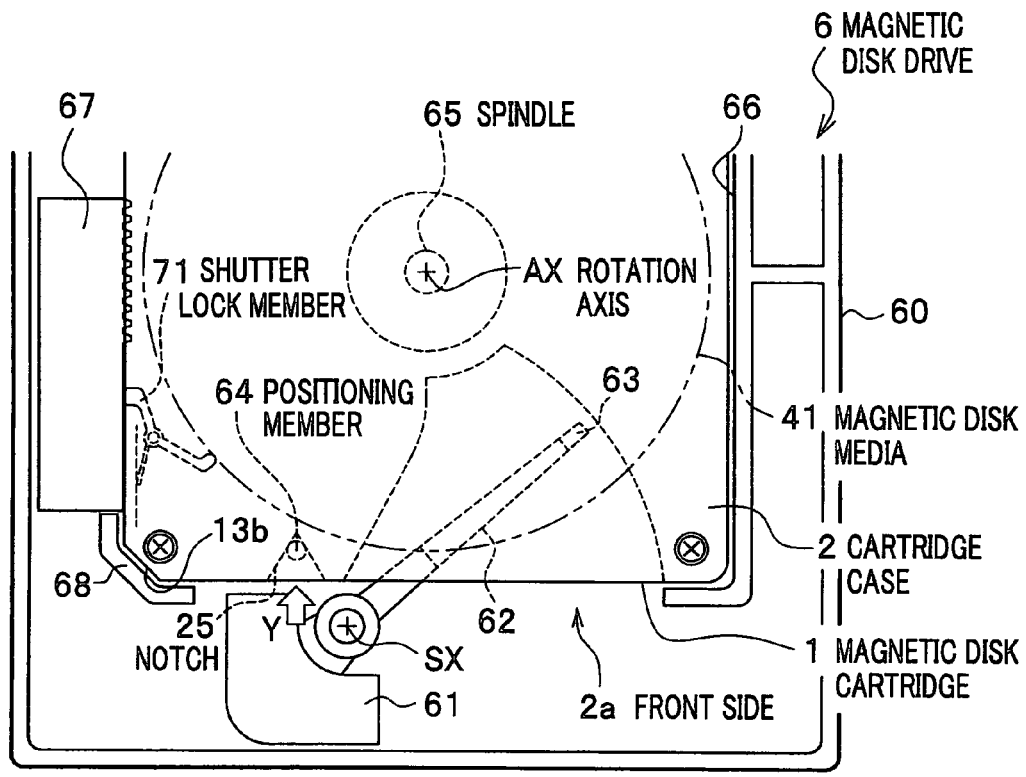
FIG. 11A is a view depicting a magnetic disk drive according to the embodiment, into which the magnetic disk cartridge is loaded.

A brief description will be given below, of a magnetic disk drive into which the magnetic disk cartridge 1 is to be loaded. Referring to FIG. 11A, the magnetic disk drive 6 includes:
1) a casing 60;
2) a storage section 66 for the magnetic disk cartridge 1, which is defined by the casing 60;
3) a shutter open gear 67;
4) a swing arm 62;
5) a magnetic head 63 mounted on the end of the swing arm 62;
6) an actuator 61 swinging the swing arm 62 round on a swing axis SX;
7) a spindle 65 rotates the magnetic media 41 (disk stack 40 (see FIG. 3A)) of the magnetic disk cartridge 1 around a rotation axis AX;
8) the positioning member 64 to be received by the notch 25 of the magnetic disk cartridge 1; and
9) the receiving member receiving the chamfered-portion 13*b* of the magnetic disk cartridge 1.

Figure 11B:
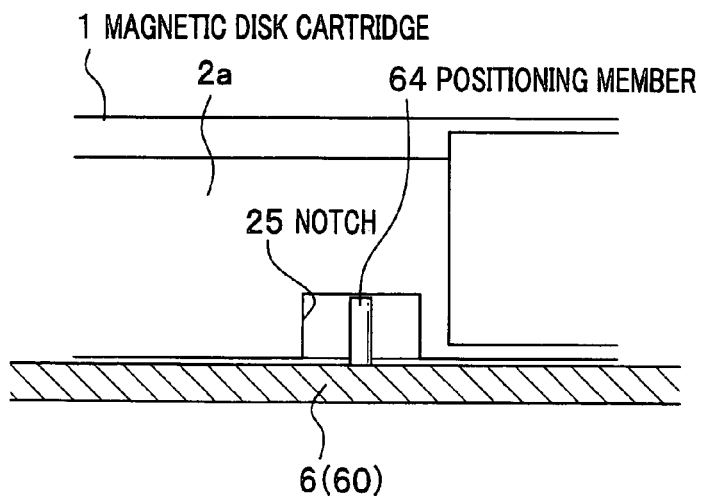
FIG. 11B is a partially enlarged view depicting a positioning member according to the embodiment, seen in a Y direction of FIG. 11A.

As shown in FIG. 11B, the positioning member 64 is a pin protruding upward from the bottom of the casing 60, and it is located near the swing axis SX as shown in FIG. 11A.

Once the magnetic disk cartridge 1 is inserted into the magnetic disk drive 6 described above through its loading slot (not shown), the shutter open gear 67 (see FIG. 5) pushes the end of the second arm 71*c* toward the interior of the side wall 13. Then, the shutter lock member 71 rotates clockwise, and the end of the first arm 71*b* is then released from the gear 51*f*. As a result, the shutter open gear 67 mates with the gear 51*f* of the lower rotor 51 and, then rotates the lower rotor 51, so that the shutter 4 opens as shown in FIG. 5.

When the chamfered portion 13*b* of the magnetic disk cartridge 1 fits the receiving member 68 of the magnetic disk drive 6 as shown in FIG. 1A, in other words, when the magnetic disk cartridge 1 is inserted correctly, the magnetic disk cartridge 1 is allocated within the storage section 68 of the magnetic drive 6. In addition, the notch 25 receives the positioning member 64 of the magnetic disk drive 6 with the both sides 25*a* and 25*a*, as shown in FIG. 4B. As a result, the magnetic disk cartridge 1 is positioned at a predetermined location of the magnetic disk drive 6. In this location, the spindle 65 of the magnetic disk drive 6 is inserted into the center hole 42*d* of the lowermost center core 42 (see FIG. 8). Note that unless being inserted correctly, the magnetic disk cartridge 1 is not accommodated within the receiving section 66.

As shown in FIGS. 11A and 11B, once the magnetic disk cartridge 1 is accommodated within the storage section 66, the notch 25 receives the positioning member 64 of the magnetic disk drive 6 with the both sides 25*a* and 25*a*. Consequently, the magnetic disk cartridge 1 is positioned at a predetermined location of the magnetic disk cartridge 1. In this position, the spindle 65 of the magnetic disk drive 6 is inserted into the center hole 42*d* of the lowermost center core 42 (see FIG. 8).

Figure 8:
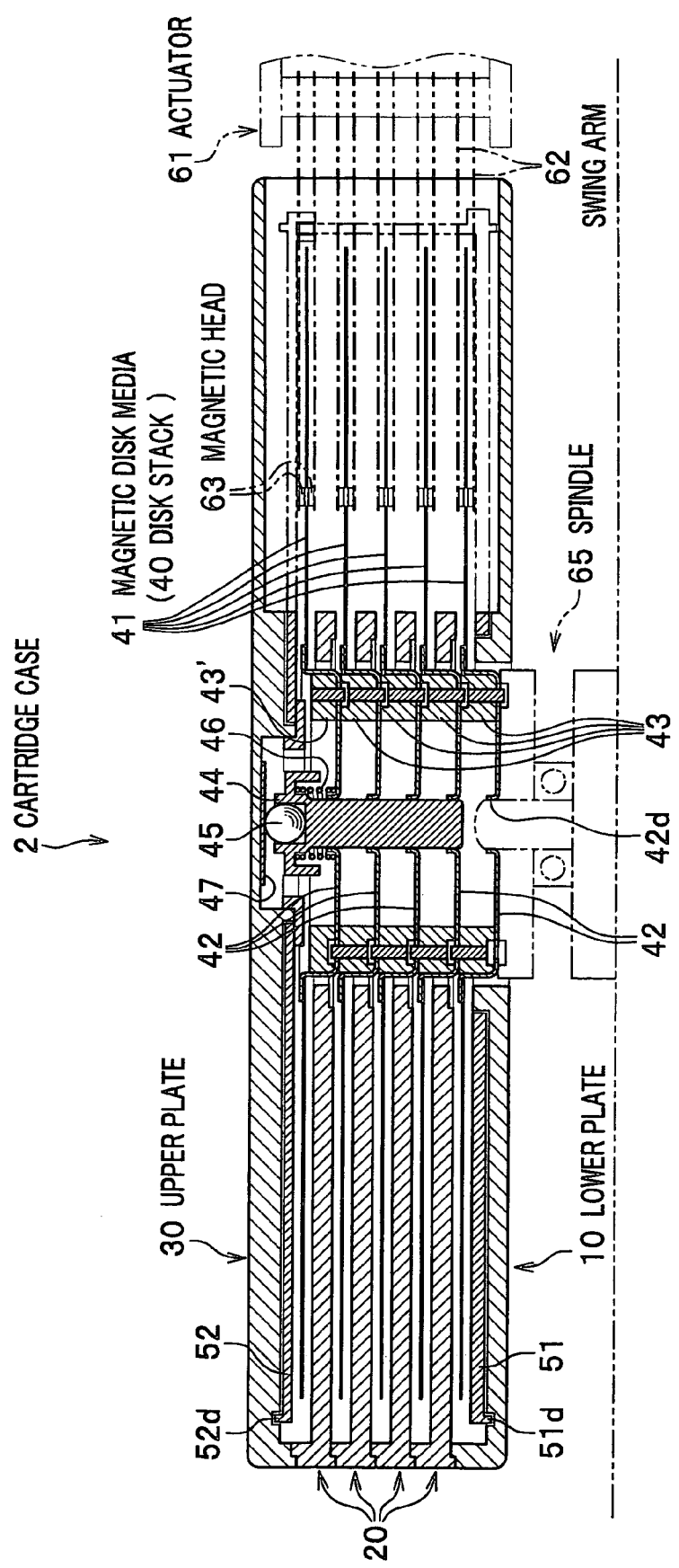
FIG. 8 is a sectional view taken along a line VIII-VIII line of FIG. 3B

Such a magnetic disk drive for recording/reproducing data for the magnetic disk cartridge 1 rotates, as shown in FIG. 8, the disk stack 40 by the spindle 65. The spindle 65 attracts the lowermost center core 42 by magnetic force, enters in the center hole 42d of the center core 42, and thereby matches an axis thereof with that of the disk stack 40. At this time, because the spindle 65 slightly lifts up the center cores 42 with resisting an energizing force of the compression coil spring 46, as shown in FIGS. 8 and 9, each of the magnetic disk media 41 is positioned at center of a space formed between the lower rotor 51 and the lowermost inner plate 20, between upper and lower inner plates 20, and between the uppermost inner plate 20 and the upper rotor 52. The magnetic heads 63 are provided at top ends of swing arms 62. Each of the magnetic heads 63 is arranged on both faces of each of the magnetic disk media 41.

The magnetic disk cartridge 1 thus described can prevent, in no use thereof as shown in FIG. 3A, an invasion of dust thereto by closing the opening 3 with rotating the shutter 4 in a counterclockwise direction of the drawing; in use thereof as shown in FIG. 3B, when loaded on the magnetic disk drive, the shutter open gear 67 fits in the groove 13a, is guided thereby, engages in the gear 51f, and rotates the shutter 4 in a clockwise direction of the drawing.

In addition, the disk stack 40 rotates by the spindle 65 rotating. After then, the swing arms 62 rotate by being driven with an actuator 61, and each of the magnetic heads 63 are moved onto each face of the magnetic disk media 41.

When recording data on the magnetic disk media 41 with the magnetic heads 63, the data is recorded thereon by sending a signal to the magnetic heads 63 by a control circuit not shown; when reproducing data from the magnetic disk medium 41, a signal is outputted by detecting a change of a magnetic field on the medium 41 with the magnetic heads 63a.

When the magnetic disk media 41 rotates at a low speed, the liners 49 comes into contact with the magnetic disk media 41 appropriately to thereby remove dust therefrom.

After the use of the magnetic disk cartridge 1, the magnetic heads 63 are retracted from the cartridge case 2, thereafter ejects the magnetic disk cartridge 1; thereby the gear 51f is driven by the shutter open gear 67, and the shutter 4 closes the opening 3. When the shutter open gear 67 releases the pressing of the second arm 71c, the plate spring 71d is released from being bent, and the end of the first arm 71b then returns to mate with the gear 51f. Finally, the lower rotor 51 cannot be rotated, and the shutter 4 (see FIG. 3A) is locked.

Thus, because the magnetic disk cartridge 1 has a plurality of the magnetic disk media 41, data transfer can be performed at a higher speed by simultaneously accessing data with a plurality of magnetic heads 63.

In addition, because the cartridge case 2 is configured by stacking up the inner plates 20, it is easy to perform a specification change of making a number of magnetic disk media 41 a different one. Then, in assembling the magnetic disk cartridge 1, because the magnetic disk media 41 can be handled with being placed on the inner plates 20 and the lower rotor 51 built in the lower plate 10, an occasion of touching the magnetic disk media 41 can be reduced and a quality of the cartridge 1 can be further stabilized.

In addition, because each of the inner plates 20 is stacked on the lower plate 10 or another inner plate 20 and is fixed, the magnetic disk cartridge 1 can make it higher a parallelism to the magnetic disk media 41, can stabilize a rotation of the media 41, and enable a higher speed rotation of the media 41, furthermore a higher speed of a data transfer.

In the magnetic disk cartridge 1, both the shutter lock member 71 and the write protect switch member 72 are arranged on the lower plate 10. Even if the type of the magnetic disk cartridge 1 is changed, the structure of the inner plates 20 and the upper plate 30 does not need to be changed. When the magnetic disk cartridge 1 is assembled, the shutter lock member 71 and the write protect switch member 72 can be transferred with being placed on the lower plate 10. In order to change the number of the magnetic disk media 41, the number of the inner plates 20 simply needs to be changed without varying the structure of each inner plate 20. In conclusion, with the structure of the magnetic disk cartridge 1, the shutter lock member 71 and the write protect switch member 72 can be arranged without deteriorating the assembly and production capacities and decreasing the flexibility of the design.

The magnetic disk cartridge 1 has the access portion to be accessed by the magnetic disk drive 6, that is, the chamfered portion 13b and the notch 25, which are both provided only on the lower plate 10. This means that any access portion is not provided on the inner plates 20 constituting the cartridge case 2. Accordingly, in this magnetic disk cartridge 1, the flexibility of the design of the magnetic disk media 41, such as the arrangement thereof, can be enhanced.

Up to this point, the embodiment of the present invention has been described. However, the present invention is not limited thereto, and various modifications and variations thereof can be conceived. For example, the disk media of the present invention are applied to the magnetic disk media in this embodiment, but alternatively, it may be applied to optical disk media.

In this embodiment, the lower plate 10, inner plates 20, and the upper plate 30 are secured to one another with the screws 91, but alternatively, they may be secured by means of adhesion or welding.

In this embodiment, although both the shutter lock member 71 and the write protect switch member 72 are arranged only on the lower plate 10, both of them may not be placed thereon.

In this embodiment, the access portion includes the shutter lock member 71 and the write protect switch member 72. However, alternatively, it may include circular and elliptic holes for positioning the magnetic disk cartridge 1 in the magnetic disk drive 6, such as ones provided in magnetic disk cartridges in compliance with the LTO standard.

What is claimed is:

1. A recording disk cartridge comprising:
   a cartridge case comprising
      a plurality of flexible recording disk media being contained within in an integrally rotatable fashion;
      a lower plate forming a lower wall of the cartridge case, the lower wall being placed parallel to the recording disk media;
      one or more inner plates being fixed on the lower plate and being stacked and partitioning the recording disk media; and
      an upper plate being fixed on the inner plates, and forming an upper wall of the cartridge case,
      the lower plate comprising at least one of a shutter lock mechanism and a write protect switch mechanism, the shutter lock mechanism being for blocking a shutter from being opened, the write protect switch mechanism being for preventing data from being erased accidentally from the recording disk media
   wherein, the shutter opens or closes an opening through which a head of a disk drive accesses an interior of the cartridge case, and the shutter and the opening are formed on the cartridge case.

2. The recording disk cartridge according to claim 1, wherein the recording disk media comprise magnetic disk media.

3. The recording disk cartridge according to claim 1,
wherein the lower plate further comprises an access portion to be accessed by a disk drive.

4. The recording disk cartridge according to claim 3,
wherein the lower plate further comprises a side wall on a part of its periphery, and
wherein the access portion comprises a chamfered portion and a notch that are both provided on the side wall, the chamfered portion being for identifying a direction in which the recording disk cartridge is inserted into a disk drive, the notch being for receiving a positioning member used for positioning the recording disk cartridge within a disk drive.

5. The recording disk cartridge according to claim 3,
wherein the cartridge case further comprises a lower rotor being sandwiched between the lower plate and one of the inner plates, and an upper rotor being sandwiched between another one of the inner plates and the upper plate, and both the lower and upper rotors constitute the shutter, and
wherein the lower rotor comprises a gear and a shutter plate that opens or closes the opening, and the shutter plate being provided on a part of a periphery of the lower rotor, the gear being provided on the periphery.

6. The recording disk cartridge according to claim 5,
wherein the shutter lock mechanism comprises a first arm for blocking the shutter from being opened by mating with the gear, a plate spring for urging the first arm toward the gear, and a second arm for moving the first arm so that the mating of the first arm with the gear is released.

7. The recording disk cartridge according to claim 1,
wherein each of the inner plates comprises a cut for exposing a record surface of the recording disk cartridge, and the cuts form the opening, when the lower plate, the inner plates and the upper plate are stacked in this order to constitute the recording disk cartridge.

8. The recording disk cartridge according to claim 7,
wherein the lower plate further comprises a lower rotor being sandwiched between the lower plate and one of the inner plates, and an upper rotor being sandwiched between another one of the inner plates and the upper plate, and both the lower and upper rotors form the shutter, and
wherein the lower rotor comprises a gear and a shutter plate that opens or closes the opening, and the shutter plate being provided on a part of a periphery of the lower rotor, the gear being provided on the periphery.

9. The recording disk cartridge according to claim 8,
wherein the lower plate comprises, on its periphery, a groove into which a shutter open gear of a disk drive that opens or closes the shutter by mating with the gear is introduced.

10. The recording disk cartridge according to claim 9,
wherein the shutter lock mechanism comprises a first arm for blocking the shutter from being opened by mating with the gear, a plate spring for urging the first arm toward the gear, and a second arm for moving the first arm so that the mating of the first arm with the gear is released.

11. The recording disk cartridge according to claim 1,
wherein the lower plate comprises a main plate forming the lower plate parallel to the recording disk media, a lower plate rib being formed on a periphery of the main plate, and a side wall standing around a corner of the main plate.

12. The recording disk cartridge according to claim 11,
wherein the side wall comprises a notch for receiving a positioning member for positioning the recording disk cartridge within a disk drive upon recording or reproducing of data.

13. The recording disk cartridge according to claim 12,
wherein the notch comprises a V-shaped notch.

14. The recording disk cartridge according to claim 11,
wherein the side wall comprises a chamfered portion for identifying a direction in which the recording disk cartridge is inserted into a disk drive.

15. The recording disk cartridge according to claim 11,
wherein each of the inner plates comprises, on its periphery, a rib extending vertically, and the rib comprises a first rib extending upward and a second rib extending downward, the first rib mating with an upper plate rib of the upper plate and abutting it, the second rib mating with the lower plate rib and abutting it.

16. The recording disk cartridge according to claim 15,
wherein the first rib of one of the inner plates mates with and abuts on the second rib of another one of the inner plates.

17. The recording disk cartridge according to claim 16,
wherein the rib, the lower plate rib and the upper plate rib form a part of the side wall formed on the recording disk cartridge, when the lower plate, the inner plates and the upper plate are stacked in this order to constitute the recording disk cartridge.

18. The recording disk cartridge according to claim 1,
wherein each of the recording disk media has a disc shape with an aperture at its center and is provided with a center core around the aperture, and the recording disk media are stacked while their individual center cores mates with one another through spacers.

19. The recording disk cartridge according to claim 1,
wherein the lower plate further comprises both the shutter lock mechanism and the write protect switch mechanism.

20. A recording disk cartridge according to claim 19,
wherein the recording disk media comprise optical disk media.

* * * * *